(12) United States Patent
Bredy

(10) Patent No.: US 7,286,213 B2
(45) Date of Patent: Oct. 23, 2007

(54) PROCESSES AND DEVICES ENABLING THE ENTRY OF A TARGET INTO A ZONE TO BE DETECTED

(75) Inventor: Thierry Bredy, Asnières les Bourges (FR)

(73) Assignee: Giat Industries, Versailles (FR)

( * ) Notice: Subject to any disclaimer, the term of this patent is extended or adjusted under 35 U.S.C. 154(b) by 325 days.

(21) Appl. No.: 10/995,177

(22) Filed: Nov. 24, 2004

(65) Prior Publication Data

US 2005/0116853 A1    Jun. 2, 2005

(30) Foreign Application Priority Data

Nov. 27, 2003   (FR) .................................. 03 14099
Nov. 27, 2003   (FR) .................................. 03 14101

(51) Int. Cl.
*G01B 11/26* (2006.01)
(52) U.S. Cl. ................ 356/141.1; 356/141.2; 342/114
(58) Field of Classification Search ............. 356/141.1, 356/141.2
See application file for complete search history.

(56) References Cited

U.S. PATENT DOCUMENTS

| 3,698,811 | A |   | 10/1972 | Weil .............................. 356/5 |
| 4,216,472 | A |   | 8/1980 | Albanese ..................... 343/7.3 |
| 4,693,181 | A | * | 9/1987 | Dadley et al. .............. 102/307 |
| 4,896,606 | A |   | 1/1990 | De Coi ........................ 102/213 |
| 5,110,204 | A | * | 5/1992 | Miles et al. ................... 356/28 |
| 5,600,253 | A | * | 2/1997 | Cohen et al. ............... 324/644 |
| 6,433,856 | B1 | * | 8/2002 | Yoo .......................... 356/3.01 |
| 6,614,510 | B1 | * | 9/2003 | Rogers ...................... 356/4.01 |
| 6,717,543 | B2 | * | 4/2004 | Pappert et al. ............... 342/13 |

FOREIGN PATENT DOCUMENTS

| DE | 40 08 395 A1 | 9/1991 |
| EP | 0 199 447 A2 | 10/1986 |
| EP | 0 800 054 A1 | 10/1997 |
| FR | 2 739 681 | 4/1997 |
| FR | 2 786 262 | 5/2000 |
| GB | 2 378 597 A | 2/2003 |
| WO | WO 98/43111 | 10/1998 |

* cited by examiner

*Primary Examiner*—Thomas H. Tarcza
*Assistant Examiner*—Tim Brainard
(74) *Attorney, Agent, or Firm*—Steptoe & Johnson LLP

(57) ABSTRACT

A process to detect the entry of a target into a zone, such process wherein it has the following stages:
  an illuminating beam is projected in the direction of the target by at least one source,
  the beam reflected on the target after its projection by one or more sources is received by at least two detectors placed in proximity to the zone and whose fields of detection incorporate a common part, each detector being synchronized to at least one of the sources,
  each travel distance separating the source and each detector via the target is computed or else only one of these distances is computed and then associated with a target presence criterion supplied by another detector,
  a target detection signal is delivered when the distance or distances thus computed, as well as qany presence criterion or criteria supplied, allow a point located geometrically in the zone under surveillance to be defined.

5 Claims, 11 Drawing Sheets

PROCESSES AND DEVICES ENABLING THE ENTRY OF A TARGET INTO A ZONE TO BE DETECTED

BACKGROUND OF THE INVENTION

1. Field of the Invention

The technical scope of the invention is that of processes and devices enabling the entry of a target into a zone to be detected.

2. Description of the Related Art

Such processes and devices are implemented namely to trigger a device ensuring the protection of a sea or land vehicle.

A defense device is known, namely by patents FR-2722873 and WO-01/88564, for an armored vehicle which implements a target tracking radar commanding the positioning of a turret allowing defense projectiles to be fired.

This device enables the destruction of the target when said target is at an appropriate distance.

Another defense device is known, by patents EP-0687885 and DE-4008395, in which radar enables a target's trajectory to be determined. This radar is coupled with a defense device comprising several munitions spaced around the turret of a tank. A fire control then determines the most suitable ammunition to destroy the target and causes them to be fired at the most appropriate time.

Known devices are complicated, fragile and costly. It is thus difficult to integrate them onto a combat vehicle. The establishment of specific connections is required between the detection device, a control unit and the defense means.

These devices implement a detection process in which single means (for example radar) ensure the emission of an illuminating signal towards the target and then process the reflected signal. This process thus comprises a data processing phase enabling the target's trajectory to be computed and the command orders of the defense device to be determined.

This process is cumbersome from a computation point of view since it implies the precise determination of the actual trajectory of the target. Furthermore, it imposes the installation of inter-connection or radio liaison means between the computation and the defense device with appropriate communication protocols.

SUMMARY OF THE INVENTION

The aim of the invention is to propose a process and a device able to overcome such drawbacks.

Thus, the process and device according to the invention ensure, both simply and reliably, the detection of a target into a zone and this without it being necessary to precisely determine the actual approach trajectory of the target.

The invention thus relates to a process to detect the entry of a target into a zone, such process wherein it has the following stages:

an illuminating beam is projected in the direction of the target by at least one source,
 the beam reflected on the target after its projection by one or more sources is received by at least two detectors placed in proximity to the zone and whose fields of detection incorporate a common part, each detector being synchronized to at least one of the sources,
 each distance separating the source and each detector via the target is computed or else only one of these distances is computed and then associated with a target presence criterion supplied by another detector,
 a target detection signal is delivered when the distance or distances thus computed, as well as any presence criterion or criteria supplied, allow a point located geometrically in the zone under surveillance to be defined.

According to one characteristic of the invention, a detection signal is delivered only if the distance or distances computed, as well as any presence criterion or criteria supplied, are located in a predefined time window.

Advantageously, at least one discriminating detector may be implemented, that is one incorporating a detection field able to spatially discriminate at least one border of the zone under observation.

According to one embodiment:

the distance between each detector and the target is computed, the distance data being enough to spatially locate the target,
 the target location data thus computed is compared with memorized definition of the zone under surveillance,
 a target detection signal is delivered when the target is geometrically located in the zone under surveillance.

According to another embodiment:

the distance between the source and one detector via the target is computed,
 this distance is compared with a memorized limit value,
 the detection of the presence of a target by a second discriminating detector is verified,
 a target detection signal is delivered when the computed distance is less than the foreseen limit and when the second detector has detected the presence of the target within its field of detection.

Advantageously, the illuminating beam or beams may be encoded.

The invention also relates to a device to detect the entry of a target into a zone that implements the process according to the invention, device wherein it comprises at least one source able to emit an illuminating beam in the direction of a target and two detectors placed in proximity to the zone and whose fields of detection incorporate a common part, each detector being synchronized with at least one source and placed so as to receive the reflected radiation on the target after its emission by said source, computation means being supplied by signals from the detectors and computing either the distances between the source and each detector via the target, or only one of these distances which is then associated with a target presence criterion supplied by another detector, the computation means supplying a target detection signal when the distance or distances thus computed, as well as any presence criterion or criteria supplied, enable a point geometrically located in the zone under surveillance to be defined.

According to one embodiment of the invention, to ensure the synchronization of the receptions with respect to the emissions, each detector is an active detector constituting a source and thus ensuring both the illumination of the target and its detection.

The illuminating beams of each active detector will thus be emitted with a time lag.

According to another embodiment of the invention, the device incorporates a single active detector constituting a source and ensuring both the illumination of the target and its detection, the other detector being a passive detector receiving the beam from the active detector reflected by the target, the passive detector being connected by a synchronization link to the active detector.

According to one embodiment of the invention, the device incorporates two passive detectors and one source separate from these detectors, such source being linked to the detectors by at least one synchronization link.

The source may be placed at a distance from the passive detectors, a rear detector directly receiving the beam emitted by the source.

At least one detector may be discriminating, that is, may incorporate a field of detection enabling at least one border of the zone under observation to be spatially discriminated.

The source or sources may emit a radar or pulse laser beam.

The invention also relates to a protection device implementing such a process and device.

The protection device according to the invention ensures, both simply and independently, the protection of a vehicle or fixed structure against a threat. It may be installed with a reduced number of interconnections between the vehicle or structure and the control or defense means.

The protection device according to the invention is characterized in that it associates at least one detection device according to the invention and at least one control or defense module whose initiation is controlled by the target detection signal after said target has penetrated into a zone of effectiveness of the control or defense module.

The control or defense module may comprise active protection means able to project in front of the target at least one interception means.

These interception means may thus comprise: at least one armored plate and/or a dart or slug from a shaped charge and/or at least one bar and/or at least one explosive projectile and/or at least one blast effect projectile.

The interception means may namely comprise at least one explosively projected bar.

According to one embodiment, the detection device associated with the control or defense module may comprise two active detectors.

According to another embodiment, the detection device associated with the control or defense module may comprise an active detector and a passive detector connected by a synchronization link.

According to one embodiment, the detection device associated with the control and defense module may comprise two passive detectors and one source separated from these detectors, such source being connected to the detectors by at least one synchronization link.

According to another embodiment, the detection device associated with the control or defense module may comprise two forward passive detectors and one passive rear detector directly receiving the beam emitted by a distance source.

According to another embodiment, the protection device may associate an emitting source and at least two control or defense modules, each module incorporating its own forward and rear detectors.

Each detector may incorporate a field of detection enabling at least one border of the zone under observation to be spatially discriminated.

Each detector may thus be positioned substantially at one of the bars ends.

BRIEF DESCRIPTION OF THE DRAWINGS

The invention will become more apparent from the following description of the different embodiment made in reference to the appended drawings, in which.

DETAILED DESCRIPTION OF PREFERRED EMBODIMENTS

Figure 1:
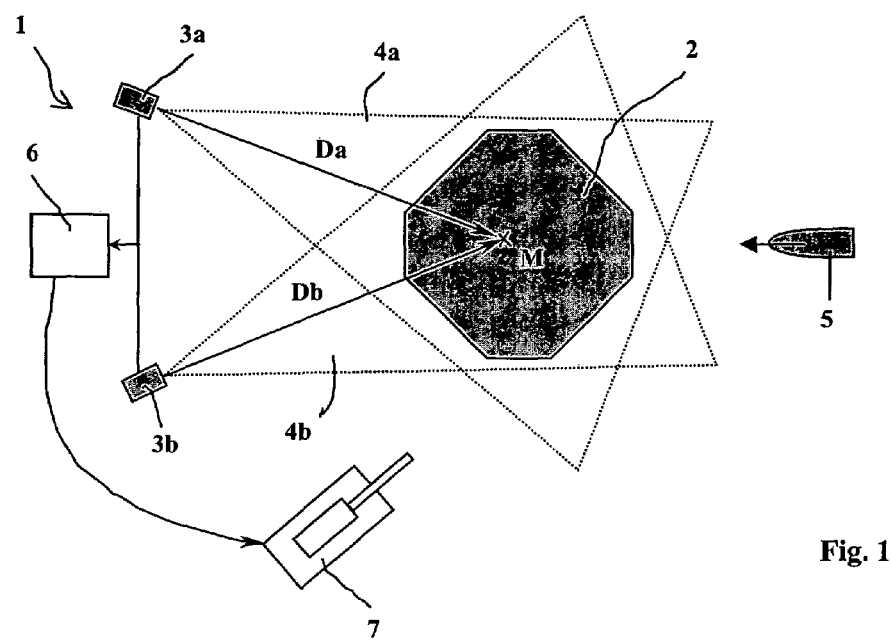
FIG. 1 is a schematic top view of a first embodiment of a device implementing the process according to the invention.

With reference to FIG. 1, a detection device 1 according to the invention ensures the surveillance of a zone 2 of land. Here, this device comprises two detectors 3a and 3b placed in proximity to the zone 2. These detectors are active detectors using laser optics technology. Each detector thus emits an illuminating beam 4a, 4b in the direction of the zone 2. Each detector also incorporates means to receive the radiation which will be reflected by a target 5 approaching the zone. Here, the target 5 shown is a projectile, such as a missile or rocket, directed towards the zone 2. The frequency of the laser pulses is of around a few kilohertz.

Radar detectors in the millimetric range may also be implemented.

Detectors 3a and 3b have fields of detection that substantially match their illuminating beams 4a, 4b and incorporate a common part that fully covers the zone 2. Thus, any target located in the zone 2 (for example at point M) receives the illuminating beams 4a and 4b and may be simply located by the measurement of the distances Da and Db separating it from each detector 3a, 3b.

It is notable that, if the location in a horizontal plane is accurate, there remains some uncertainty regarding the location of the target in a perpendicular direction to this plane. This uncertainty depends on the width of the illuminating beams 4a, 4b along this third direction in space. In practical terms, this uncertainty may be negligible with a span of the illuminating beams of +/−15° with respect to the horizontal plane.

Detectors 3a and 3b are connected to computation means 6 able to calculate the distances between each detector 3a and 3b and the target 5 when said target enters the field common to both detectors. The computation means are constituted, for example, by a microprocessor incorporating appropriate programming enabling the performance of the process according to the invention. This microprocessor will ensure the piloting of the detectors 3a, 3b and the utilization of the signals they supply.

In this particular embodiment, each detector is also an emitter. It thus also constitutes a laser illuminating source and there is a synchronization between the signals emitted and received after reflection on the target. It is thus possible for the distances to be determined by simply measuring the time separating an emission from the reception of the signal reflected by the target 5. The computation means 6 thus easily determine the total distance covered by the radiation between a source and a detector via the target. The detector/target distance is equal to half this travel distance.

Thanks to the computation means 6, each detector is synchronized to itself and waits for the signal reflected by the target in a lapse of time of around a few nanoseconds after emission (observation window).

Furthermore, to avoid interference between the signals supplied by each detector and thus avoid measurement errors, a time lag will be provided between the emission of one or other of the active detectors 3a, 3b. This will be memorized in the computation means 6 piloting the emissions of each detector. The observation windows of each measurement path must therefore have no common part.

A time lag of around a few tens of nanoseconds between the emissions of each source 3a, 3b is enough for a mean distance between an emitter 3 and the zone 2 of around 20 m. This time lag must be greater than the observation window so as to ensure the discrimination of the signals coming from one or other source.

Lastly, the computation means 6 incorporate in their memory a pre-established time window inside which the two distance measurements must be located in order to be validated. Such an arrangement helps to eliminate false alarms.

Moreover, to protect the device against any countermeasures, the laser beams may be encoded and a decoding circuit may be provided in the computation means 6.

After the distances Da and Db have been measured, the computation unit 6 verifies that the target 5 thus detected is actually inside the zone 2. This verification is easily performed by means of a suitable algorithm using a geometric definition of the zone 2 previously memorized in the computation means 6.

If the target 5 is actually inside the zone 2, the computation means activate a control or defense module 7, here a weapon system mounted on a vehicle, said system whose zone of effectiveness includes the zone 2.

Figure 2:
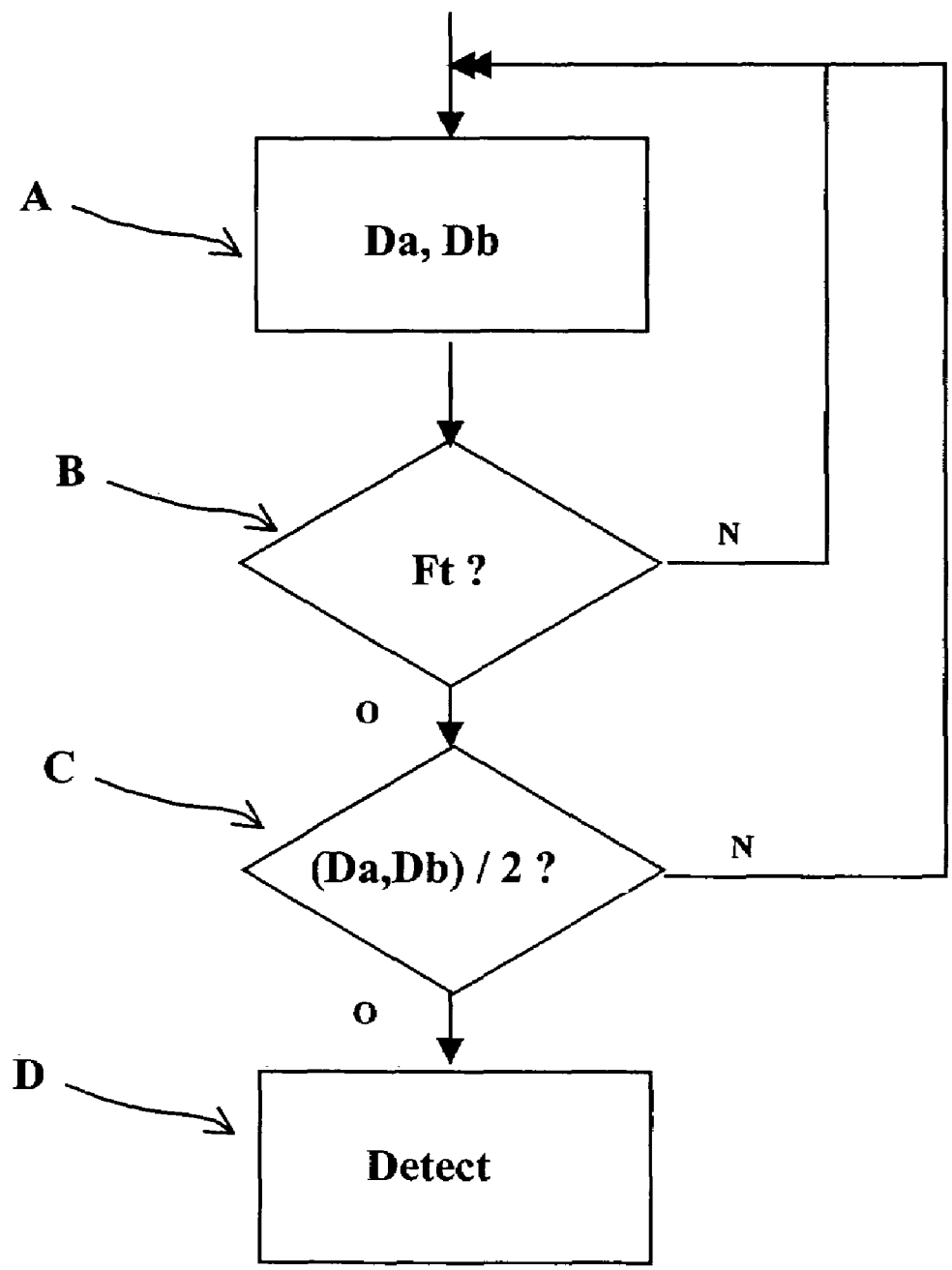
FIG. 2 is a logical diagram schematizing the stages of the process according to the invention.

The process implemented by this embodiment of the invention is schematized in FIG. 2.

During a first stage (block A) the distances Da and Db between each detector/source 3a, 3b and the target 5 are measured. The fact that these measurements are located inside the predetermined time window Ft is verified (test B), so as to eliminate false alarms. A measurement that is only present along a single path is thus eliminated. The values measured are then compared with the geometric definition of the zone 2 (test C: Da, Db/(2)).

A target detection signal (block D) is supplied when the measured point M corresponding to the location of the target 5 is geometrically located inside the zone 2 under surveillance.

The devices according to the state of the technique require several successive measurements for a single detector of the distance between it and a target so as to know its trajectory and thus deduce its location in a given zone.

The device and the process according to the invention enables detection to be simplified since the conjunction of two distance measurements instantly supplies data confirming the location inside a zone or not.

The device and the process proposed by the invention will thus be more efficient and selective if the zone 2 is of a reduced size and if the illuminating beams 4a, 4b are able to approach its geometry.

The device according to the invention is thus particularly well adapted to active protection devices for example of a vehicle or fixed structure.

Figure 3:
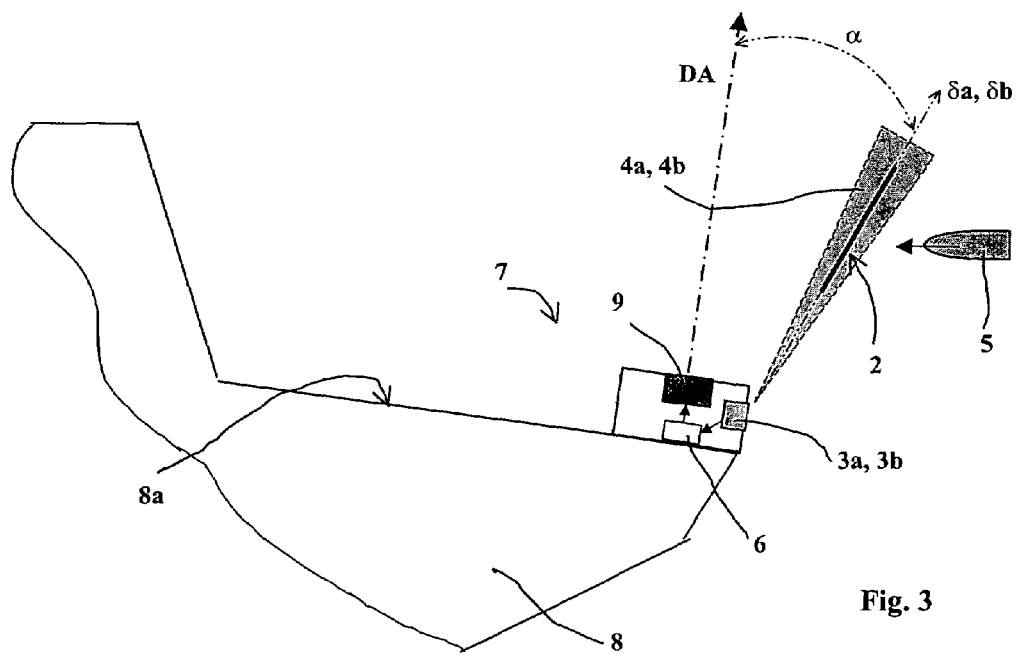
FIG. 3 is a schematic side view of a second embodiment of a device according to the invention.

FIG. 3 thus shows an embodiment of a protection device comprising an active defense module 7 integral with the glacis 8a of an armored vehicle 8.

This module incorporates projectable interception means 9 which may be constituted by one or several armored plates able to be projected further to the ignition of a sheet of explosive by a detonator (these armor plates are described, for example, in patents DE-2719150 or FR-2679022).

The projectable interception means 9 may alternatively comprise one or several shaped charges (hollow charges or explosively-formed charges) arranged in a line or quadrilaterally. Patents FR-2786262, GB-1421379 and U.S. Pat. No. 3,893,368 describe such active modules implementing shaped charges.

In a preferred manner (such as shown in the Figures) the projectable interception means 9 may comprise one or several bars projected further to the ignition of an explosive. Patent FR-2805037 describes such a bar-projecting charge, which is particularly effective against kinetic or APFSDS projectiles.

The projection of bars or plates is performed along a direction of action DA substantially perpendicular to the vehicle's glacis 8a.

In accordance with the invention, the active defense module 7 comprises two detectors 3a, 3b connected to computation means 6 that control the projection of the interception means 9 after a delay following detection so as to allow the target 5 to be positioned above the module 7.

As in the previous embodiment, the detectors 3a, 3b are here active detectors each emitting a laser illuminating beam 4a, 4b in the direction of a zone 2 and incorporating reception means for the radiation reflected by a target 5 approaching the zone.

So as to efficiently ensure the detection of the target 5, the detectors 3a, 3b will have a direction of illumination and observation $\delta a$, $\delta b$ that will form an angle $\alpha$ with the direction of action DA, said angle being less than 90°.

When the target 5 enters the defended zone 2 (which may be considered as a quadrilateral arranged in a plane formed by directions $\delta a$ and $\delta b$), the computation module 6 commands (after the delay required for the target to be position above the module) the projection of the interception means 9 in the direction DA, thereby causing the destruction or destabilization of the target 5.

The advantage of this protection device according to the invention is that each defense module 7 is fully autonomous regarding the determination of its triggering time.

The defense modules are thus inexpensive and quite robust. They only require connecting to the electrical network, or if the module has its own supply require no connecting at all. The invention thus enables the protection of existing vehicles to be improved both simply and economically.

By way of a numerical example, for a defense module projecting a steel bar of a length of 0.4 m at a velocity of around 500 m/s, it is possible, in less than one millisecond and at 2 m from the module, to detect a passing target 5 following a trajectory located 1.5 m above the module. The angle α formed by the direction of observation δ with the direction of attack will be around 30° and the repetition frequency of the laser sources will be around 3 kHz.

These performances enable the target 5 to be destroyed.

The adjustment of angle α enables part adaptation to the different ranges of target velocities. The faster the target, the higher the angle α should be in order for the target to be detected early giving enough time for the interception means to be projected.

The angle α may be fixed in the design of the defense module. In this case, the module will give optimal performances against targets having a specific velocity.

A defense module may be defined, however, in which the angle α may be modified (by inclining the receiver or by using appropriate optical collimation).

In this case, means (for example, radar) will be provided on the vehicle enabling the approach velocity of the projectile to be measured and the angle α to be remotely modified from the vehicle in order to give it the most appropriate inclination for the type of target detected.

Figure 4A:
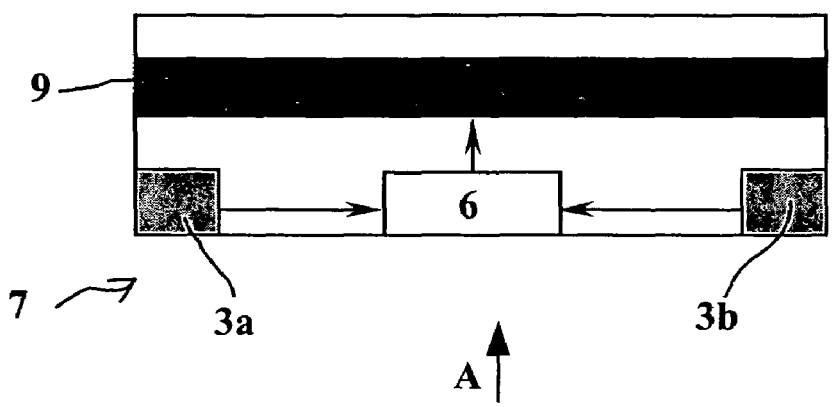
FIGS. 4a and 4b are two schematic views of a protection device according to the invention, FIG. 4b being a top view of the device (view along arrow B shown in FIG. 4b) and FIG. 4b being a front view of the device (view along arrow A shown in FIG. 4a)
Figure 4B:
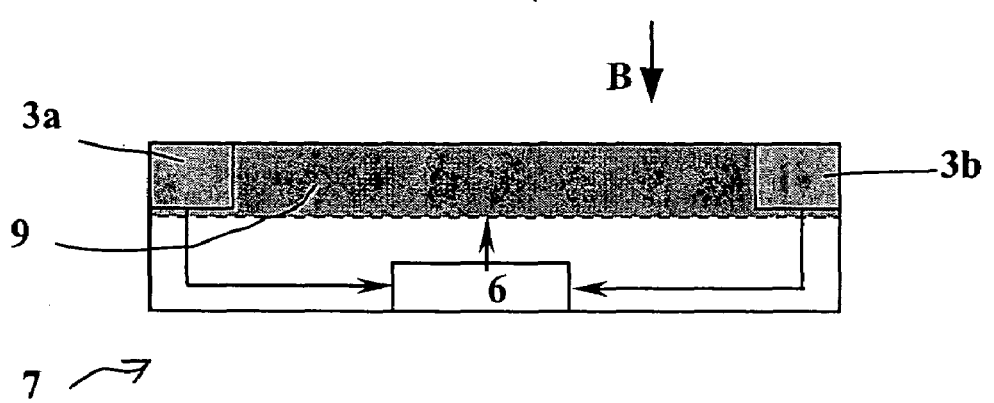

FIGS. 4a and 4b show two different views of this embodiment of an active defense module 7.

The module 7 is in the shape of a rectangular parallelepiped. It incorporates interception means 9 that comprise a bar able to be projected by an explosive, such bar arranged according to one of the bar's lengths (see patent FR-2805037).

The bar 9 is seen from the top in FIG. 4a. It is hidden in FIG. 4b (and is thus shown in light grey) and is to the rear of the detectors 3a and 3b. Each detector 3a, 3b is arranged substantially at one of the ends of the bar 9 for reasons that will be explained after.

The electronic module 6 is connected to the detectors 3a, 3b and controls the ignition of the interception means 9 using a classical ignition device (such as a detonating primer), not shown.

Figure 5:
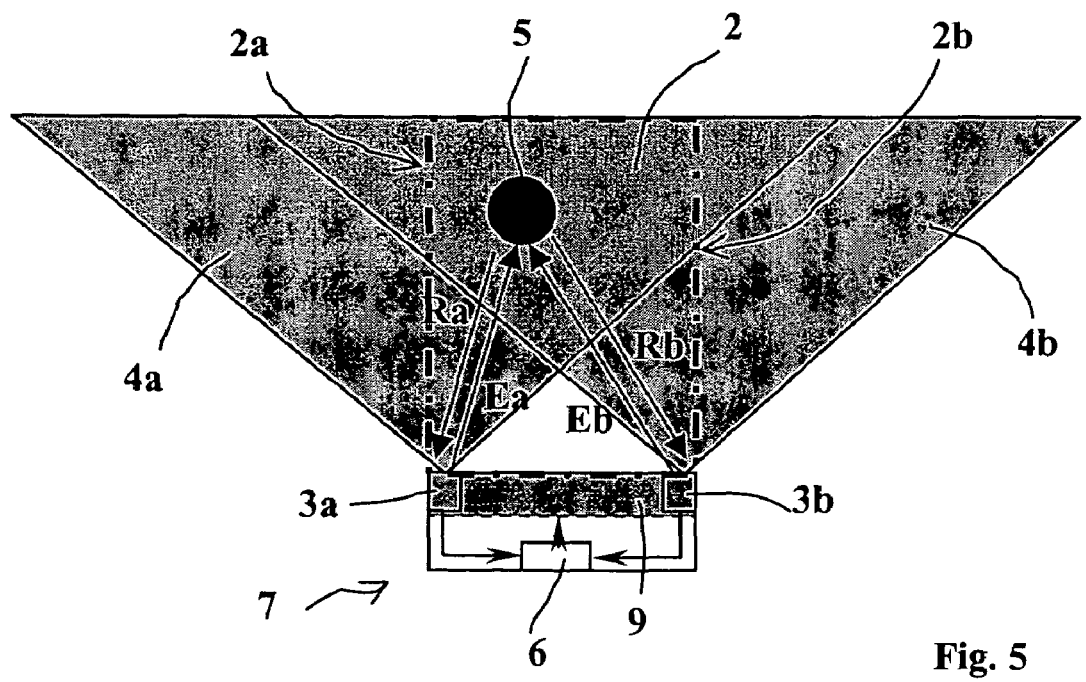
FIGS. 5 and 6 are schematic frontal representations of the implementation of other embodiment of a protection device according to the invention.

FIG. 5 shows this active defense module 7 according to an analogous view to that of FIG. 4b. This Figure enables the shape (in projection) of the fields of detection 4a and 4b to be visualized for this particular embodiment.

This embodiment is analogous to that described with reference to FIG. 1. Detectors 3a and 3b are active detectors. Each detector emits an illuminating beam over fields 4a and 4b. Part of the radiation emitted (arrows Ea and Eb) is reflected onto the target 5 (arrows Ra and Rb) and is received by detector 3a or 3b. The logical diagram is that shown in FIG. 2. Each distance Da, Db is equal to half the travel distance of the radiation between the detector/source (3a, 3b) under consideration and itself via the target 5. The computation module 6 thus estimates the distances Da and Db and verifies that these distance measurements take place in a predefined time window Ft inside which the two distance measurements must be carried out.

The projection of the zone 2 in a vertical plane matching the plane of the direction of action DA of the bar 9 is shown in dotted lines in FIG. 5. It does not correspond to all the common part of the beams 4a and 4b. Indeed, for the interception means 9 to be effective against the target 5, they need to be triggered only if the trajectory of the target passes between the vertical planes 2a, 2b that pas by the ends of the bar 9. This geometric definition of the zone 2 is memorized in the computation means which will then determine (test C) is the target 5 is in fact in the protected zone.

Figure 6:
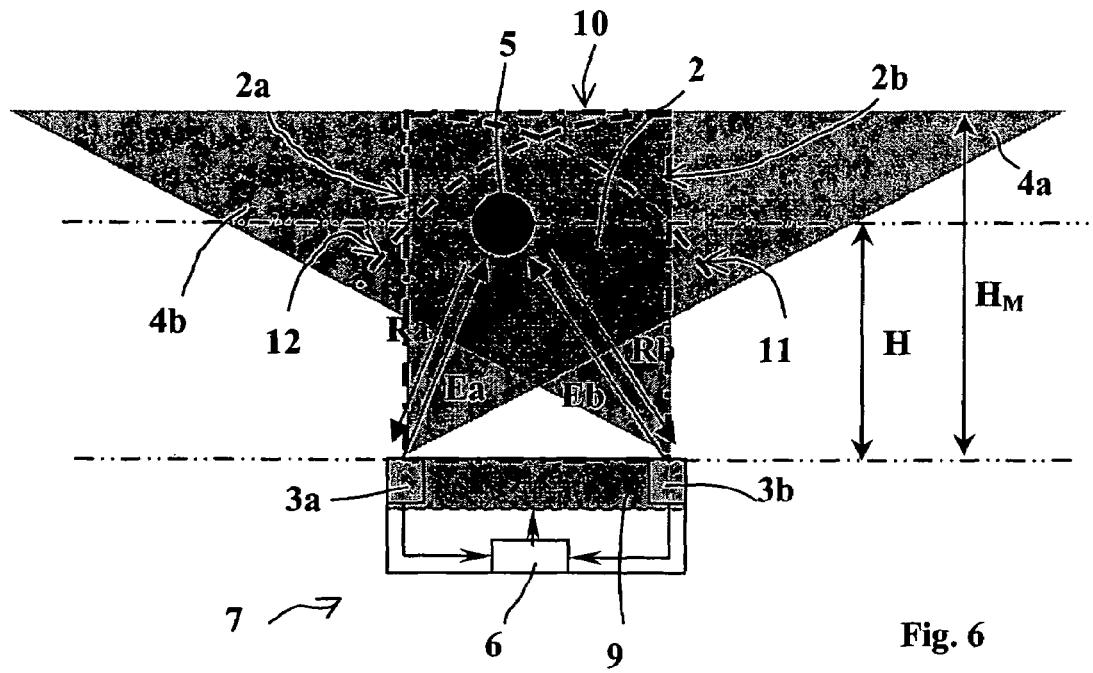

FIG. 6 schematizes another embodiment of a device according to the invention. This mode differs from the previous one in that each active detector 3a, 3b is spatially discriminating. Each detector thus incorporates a filed of detection 4a and 4b that spatially delimits a border 2a or 2b or the zone 2 under observation.

Such spatial discrimination may be easily obtained by implementing appropriate optics on each detector or else by simply pivoting each detector so as to vertically position one of the limits of its field of observation 4a or 4b.

Because of the positioning of each detector 3a, 3b substantially at one end of the bar 9, the vertical limits of the fields of observation thus define (in projection in the vertical plane matching the plane of the direction of action DA of the bar) the limits 2a and 2b of the bar's 9 zone of effectiveness.

Such an embodiment of the invention enables the computation means to be simplified since it is no longer necessary to introduce a precise geometric definition of the zone 2.

Indeed, it is possible to verify only that the target 5 passes at a height H with respect to the defense module 7 that is compatible with the module's effectiveness.

This height H must be less than a height $H_M$ (limit 10 in zone 2). For this, Da and Db must merely be verified to be less than or equal to $H_M$. The arcs of a circle 11 and 12 correspond to these two conditions, respectively $Da \leq H_M$ and $Db \leq H_M$.

Figure 7:
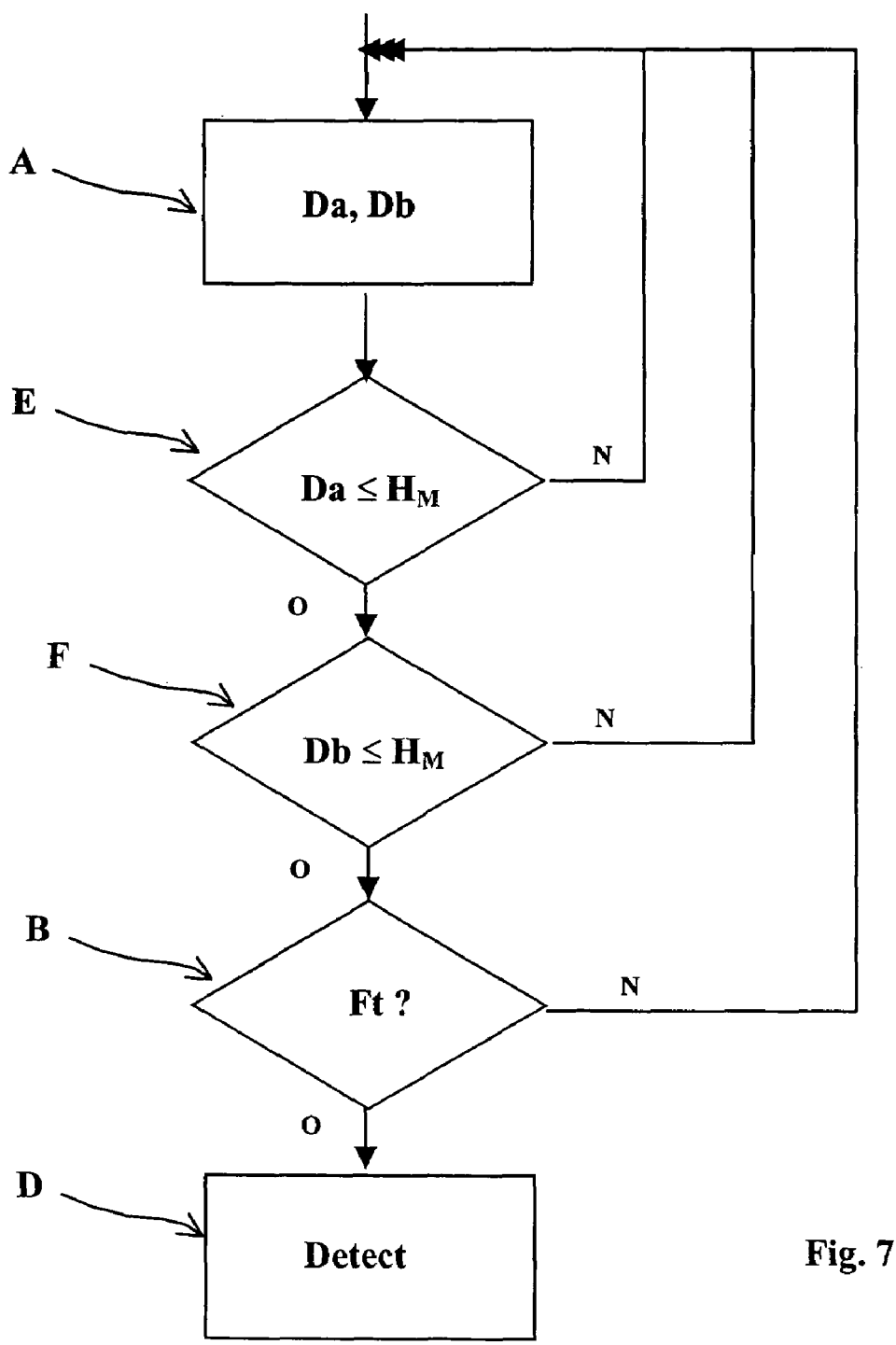
FIG. 7 is a logical diagram schematizing the stages of a variant of the process according to the invention.

A variant of the process schematized in FIG. 7 is implemented, in this case.

After measuring Da and Db (block A), tests E and F are carried out (one after the other or at the same time) that enable us to verify that the distances measured Da and Db are effectively less than or equal to the maximal accepted height $H_M$.

As for the previous embodiment (test B), it is verified that the measurements take place in a predefined time window Ft inside which the two distance measurements must be made. This is in order to eliminate false alarms.

If all the conditions have been fulfilled, a target detection signal (block D) is supplied. This signal is used by the computation module 6 to control the projection of the bar 9 (naturally, after the delay required for the target 5 to be positioned above the module 7).

Figure 8:
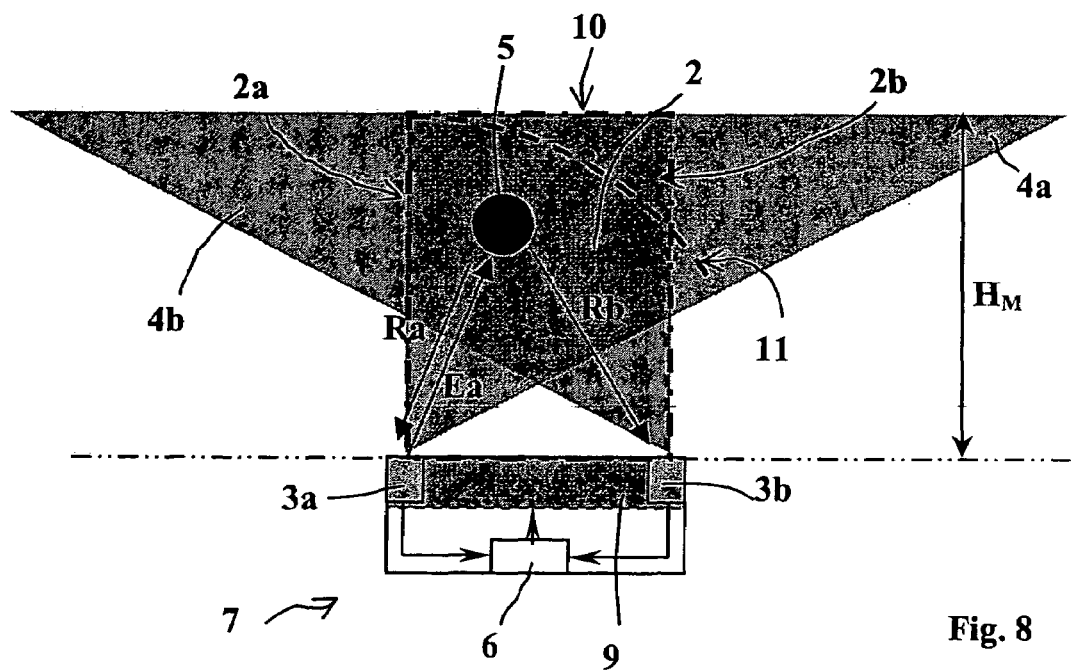
FIG. 8 is a schematic frontal representation of the implementation of another embodiment of a protection device according to the invention.

FIG. 8 schematizes another embodiment of a device according to the invention. This embodiment differs from the previous one in that only detector 3a is active and ensures an emission over a field of illumination 4a. Detector 3b is passive (made using the same technology as the sensor incorporated into the active detector), and has a field of observation 4b.

As in the previous embodiment, fields 4a and 4b are spatially discriminating and thus spatially delimit one of the borders 2a or 2b of the zone 2 under observation.

Part of the radiation emitted by the detector (arrow Ea) is reflected on the target 5 and is received both by the active detector 3a (arrow Ra) and by the passive detector 3b (arrow Rb).

The active detector 3a is thus indirectly connected to the passive detector 3b by means of the computation unit 6 that synchronizes the signals received from the passive detector 3b with the emission of the active detector 3a.

False alarms are thus sure to be avoided. In practical terms, for a signal Rb to be accepted, it must arrive at the passive detector 3b within a given time window Ft after the emission of the signal Ea by the active detector 3a.

The process implemented is thus simplified, since a single distance measurement (Da) is required.

Figure 9:
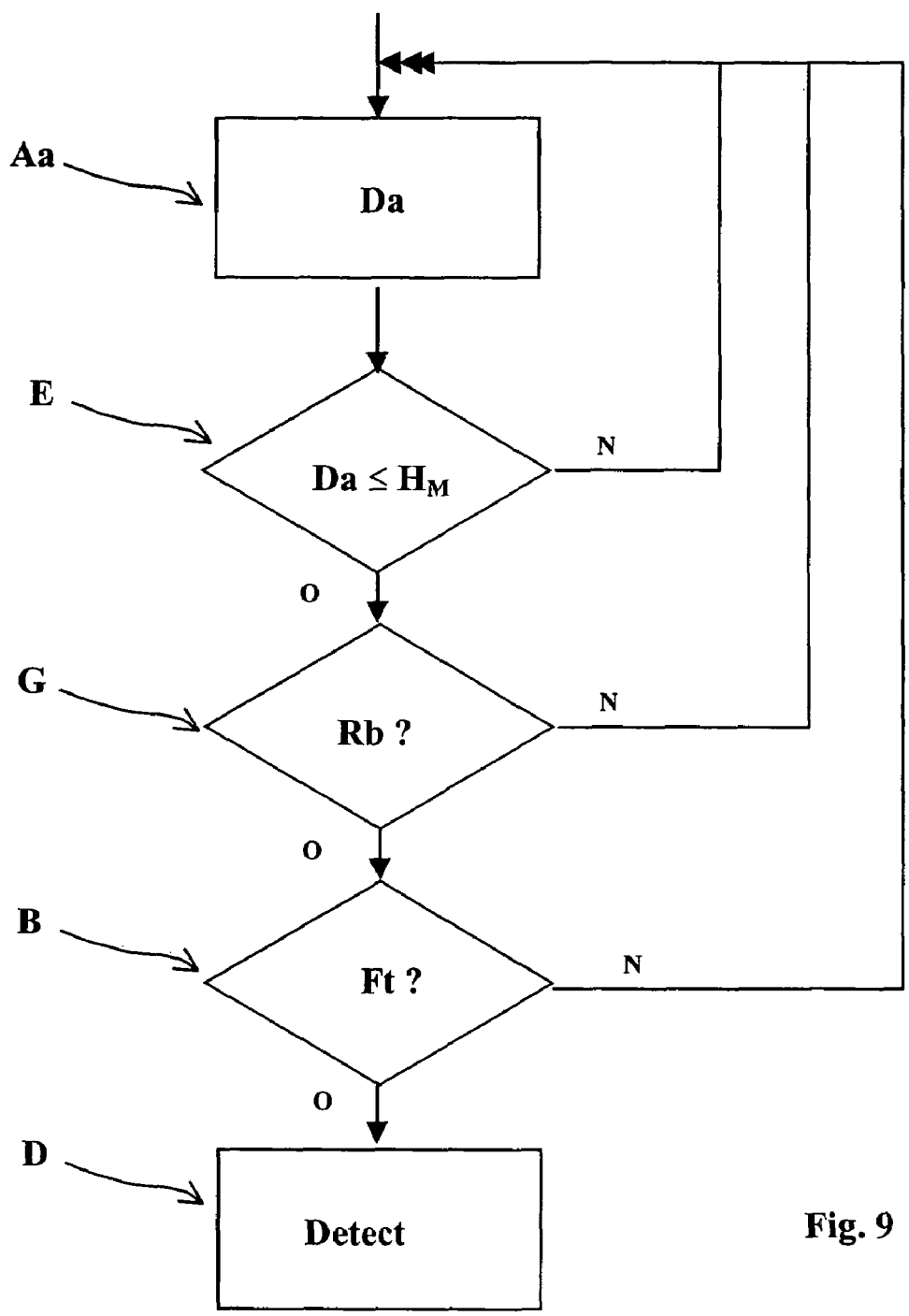
FIG. 9 is a logical diagram schematizing the stages of a variant of the process according to the invention.

FIG. 9 schematizes this variant of the process.

Block Aa corresponds to the single measurement of the distance Da of the active detector 3a to the target 5. Test E verifies that this distance Da is less than or equal to the maximal accepted value $H_M$ (arc of a circle 11).

Test G is a verification criterion of the reception by the passive detector 3b of a signal reflected by the target 5 (presence criterion without computation of distance). Test B is the verification that this reception occurs within a given time window Ft after the emission of the signal by the active detector.

If all the conditions are fulfilled, a target detection signal (block D) is supplied. This signal is used by the computation module 6 to control the projection of the bar 9.

This embodiment also makes it possible to reduce the cost of the device (passive detectors are less expensive than active detectors) and to reduce the consumption of electrical power.

Figure 10:
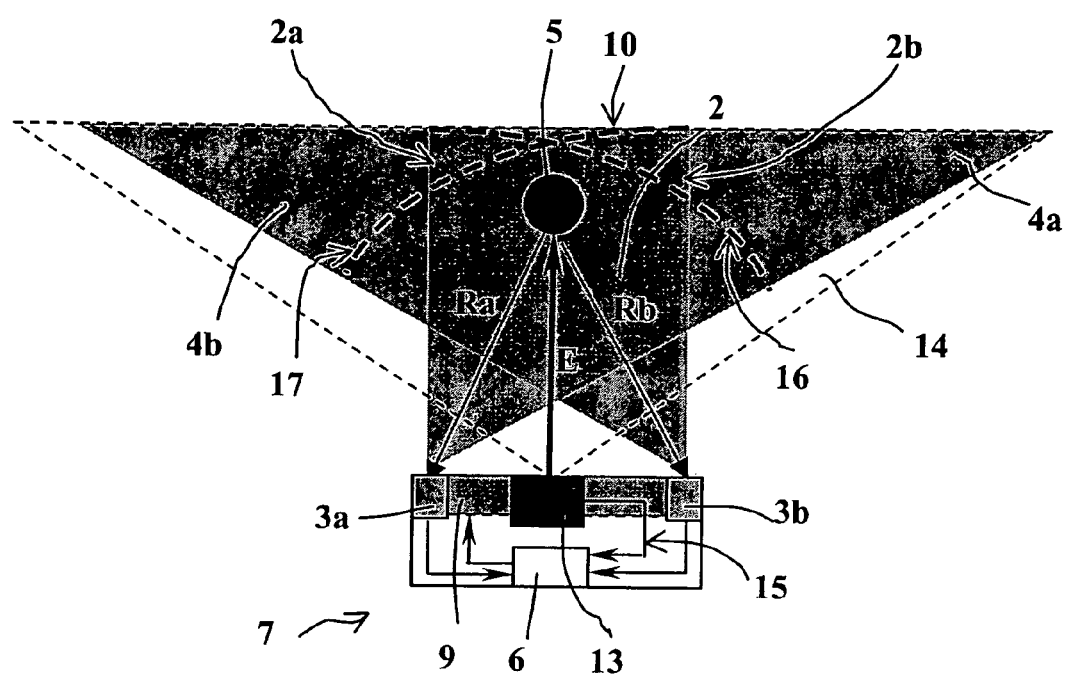
FIG. 10 is a schematic frontal representation of the implementation of another embodiment of a protection device according to the invention.

FIG. 10 schematizes another embodiment of a device according to the invention. This embodiment differs from the previous ones in that two detectors 3a and 3b are passive detectors each having a field of observation 4a, 4b.

As in the previous embodiments, fields 4a and 4b are spatially discriminating and they thus spatially delimit one of the borders 2a or 2b of the zone 2 under observation.

A source of illumination 13, separate from the detectors, is integral with the defense module 7 and is connected to the computation module 6 by a link 15. This source emits an illuminating laser beam 14 that covers the zone under surveillance 2. The source 13 is thus indirectly connected to detectors 3a, 3b by means of the computation unit 6 and by the synchronization link 15.

Thanks to the link 15, the computation unit 6 ensures the synchronization between the signal E emitted by the source 13 and signals Ra and Rb received by detectors 3a and 3b after being reflected on the target 5. The lapse of time separating the emission E of the signal and the reception of the reflected signals Ra and Rb is thus accurately controlled and it is thus possible for the computation unit to determine the radiation travel distances between the source 13 and each detector 3a, 3b via the target 5. These distances will be noted $\Delta a$ and $\Delta b$, where: $\Delta a = Da + D$ and $\Delta b = Db + D$, expressions in which D represents the distance from the source 13 to the target 5.

Since the source is separate from the detectors, it is no longer possible, as in previous embodiments, to directly determine Da and Db, but this is of no practical importance since, to ensure that the target 5 is actually in zone 2, it suffices to verify that the distances $\Delta a$ and $\Delta b$ are less than a limit $\Delta max$. The locus of the points corresponding to the condition $\Delta a = \Delta max$ is the arc of an ellipse shown in dotted lines 16. Similarly, the locus of the points corresponding to the condition $\Delta b = \Delta max$ is the arc of an ellipse 17.

So as to eliminate false alarms, a time window Ft will be determined between the emission by the source 13 of an illumination signal and the reception by detectors 3a and 3b of a signal reflected by the target 5.

The process implemented will, in this case, be analogous to that schematized by the logical diagram in FIG. 7, which is analogous to that schematized in the logical diagram in FIG. 9 with the substitution in each stage Da, Db and $H_M$ respectively by $\Delta a$, $\Delta b$ and $\Delta max$.

In accordance with the logical diagram in FIG. 7, the two distances $\Delta a$ and $\Delta b$ may thus be measured and verified to both be less than or equal to $\Delta max$ in the required time window.

In accordance with the logical diagram in FIG. 9, alternatively only one distance $\Delta a$ or $\Delta b$ need be measured and verified as less than or equal to $\Delta max$, verification then being made that the other detector has received a signal reflected by the target within the required time window (target presence criterion).

The source 13 is preferably linked to the defense module 7 to simplify its linkage to the computation module 6 allowing the signals to be synchronized. It would naturally be possible for the source 13 to be positioned at a distance from the module 7 on condition that means are provided enabling synchronization to be carried out by the computation unit 6 of the signal emitted by the source 13 with the reflected signals received by detectors 3a, 3b.

This synchronization liaison might be in wire form or else be a radio or optical liaison.

A single source may thus be associated with several defense modules 7.

Figure 11:
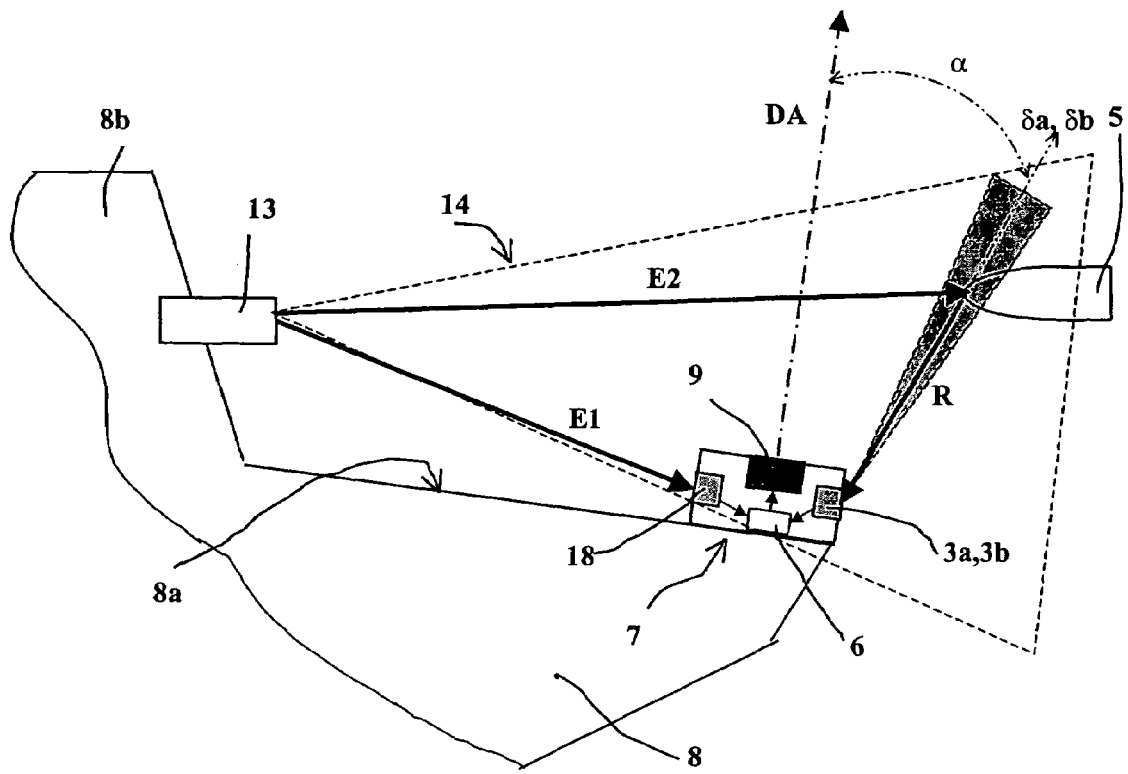
FIG. 11 is a schematic side view of another embodiment of a device according to the invention.

FIG. 11 is analogous to FIG. 3 but shows another embodiment of a protection device in which the source 13 is integral with the turret 8b of an armored vehicle 8, and thus positioned at a distance from the module 7.

In this case, the active defense module 7 incorporates, in addition to the two front detectors 3a and 3b, a rear detector 18. All the detectors are connected to the computation means 6 controlling the projection of the interception means 9 after a delay following detection in order to give time for the target 5 to be positioned above the module 7.

The illuminating source 13 illuminates both the defense module 7 and the target 5.

The rear detector 18 ensures the synchronization of the source 13 with detectors 3a and 3b.

Indeed, the rear detector 18 directly receives the radiation E1 emitted by the source 13 whereas the front detectors 3a, 3b receive the radiation R reflected by the target 5 after emission E2 by the source 13.

The computation means 6 are supplied with the signals produced by front detectors 3a and 3b and the rear detector 18. These means are designed or programmed so as to supply a target detection signal when the reflected beam R is received after the reception of the emitted beam E1 and after a lapse of time $\Delta t$ less than or equal to a reference value memorized in the computation means 6.

According to the geometry of the protection device, the Expert will easily determine the maximal time gap (Tret) that has to separate the arrivals of the laser signals at the rear detector 18 and front detectors 3a and 3b, so that the distance separating the defense module 7 and the target 5 is such that the latter is located in zone 2. In this case, the travel distances measured between the source and the detectors via the target is deducted from the simple measurement of the time gaps separating the arrival of the signal emitted by the source at the rear detector 18 and the arrival of the signal reflected by the target on the front detectors 3a and 3b.

Proximity fuses implementing front and rear sensors integral with a projectile and illuminated by a same source (fuses which enable a distance to be deduced from the measurement of the time gaps between the receptions of the signals) are well known to the Expert. Reference may be made to patents U.S. Pat. No. 3,698,811 and FR-2739681 that describe such fuses.

When the target 5 is in zone 2 of the active defense module 7, the computation means 6 (following the delay required for the target to be positioned above the module) command the projection of the interception means 9 in direction DA, thereby destroying or destabilizing the target 5.

The advantage of this protection device according to the invention lies in that each defense module 7 is fully autonomous with respect to the determination of the triggering time and in that the detection of the target 5 is ensured in a simple manner thanks to a laser source 13 separate from the defense module 7.

Another advantage lies in that it is possible, if necessary, to render the defense modules inactive. For this, the laser emission provided by the source 13 merely has to be suspended.

So as to effectively ensure the detection of the target 5, the front detectors 3a and 3b will, once again, have a direction of observation δ which will form an angle α with the attack direction DA, such angle being less than 90°.

Once again, adjusting the angle α will enable partial adaptation to the different ranges of target velocities. The faster the target, the higher the angle α should be in order for the target to be detected early giving enough time for the interception means to be projected.

Figure 12:
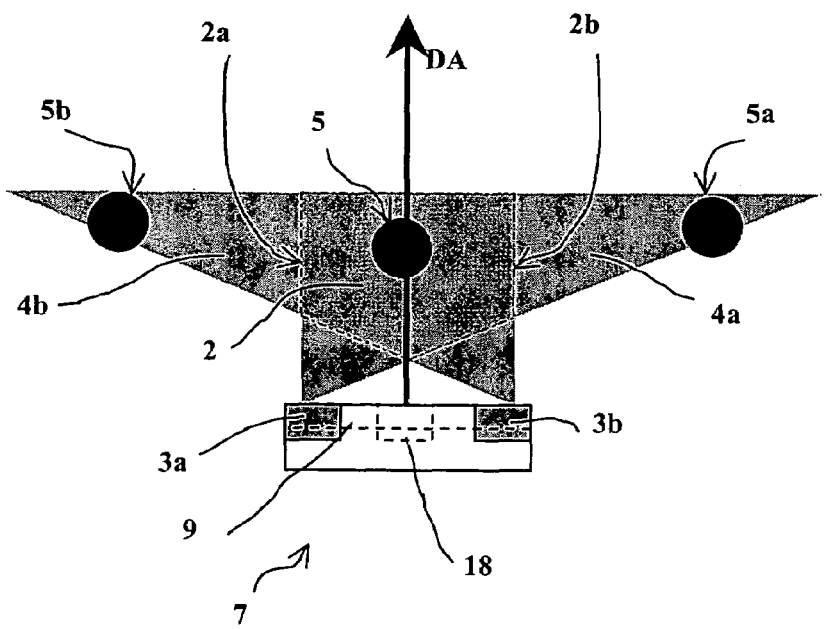
FIG. 12 is a schematic frontal representation of the implementation of the embodiment in FIG. 11, FIGS. 13a, 13b and 13c are block diagrams showing embodiments of computation means implemented by the device according to the embodiment in FIGS. 11 and 12, FIGS. 14 and 15 are schematic representations of other embodiments of a protection device according to the invention.

FIG. 12 shows a front view of this embodiment of the defense module 7 projecting a bar 9. The defense module 7 will incorporate two front detectors 3a and 3b that will be arranged substantially at each end of the bar to be projected 9. Such an arrangement enables an interception zone 2 to be materialized which is the intersection of detection zones 4a and 4b of each front detector 3a, 3b.

Moreover (as in the embodiment in FIG. 10), each detection zone 4a and 4b of each front detector 3a, 3b has a shape such that it has a border (2a and 2b) substantially the same as a plane parallel to the direction of action DA according to which the bar 9 is projected and which passes by one end of the bar 9.

The interception zone 2 is thus compatible with the zone of action of the bar 9. That is to say, when a target is detected in this interception zone, it is possible for it to be destroyed by the bar 9 by projecting said bar after a suitable time.

Figure 13A:
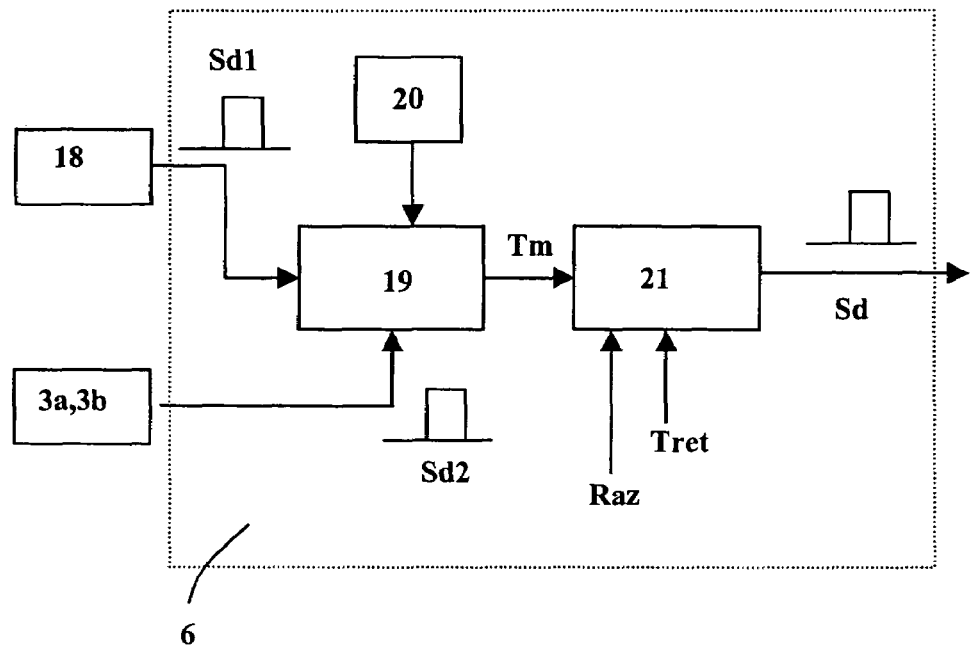

By way of illustration, FIG. 13a is a block diagram showing (for a measuring channel 3a or 3b) one embodiment of computation means 6 implementing a classical range finder using a single source and front 3a, 3b and rear 18 detectors.

The computation means 6 comprise a counter 19, cadenced by a timer 20, whose counting is initiated by a pulse Sd1 supplied by the rear detector 18 further to the detection of a signal supplied by the source 13.

The counting is stopped by a pulse Sd2 supplied by a front detector 3a or 3b further to the detection of a signal reflected by the target 5.

A comparator 21 is connected to a memory holding the reference value Tret and compares the gap measured by the counter Tm with this reference value Tret. A detection signal Sd is supplied if Tm is less than or equal to Tret. This signal corresponds to the detection of the approaching target at a given distance that is deduced from this time gap measurement Tm.

Naturally, the comparator 21 is reset (input Raz) periodically at a frequency equal to the frequency of repetition of the laser source. Thus, the computation means effectively ensure the comparisons of the gaps measured Tm for each period of the signal supplied by the source 13.

To protect the device from any counter measures, encoding of the laser beam may advantageously be provided and a decoding circuit be incorporated into the computation means. This circuit (not shown) will be positioned between each detector 18 and 3a or 3b and the counter 19.

Figure 13B:
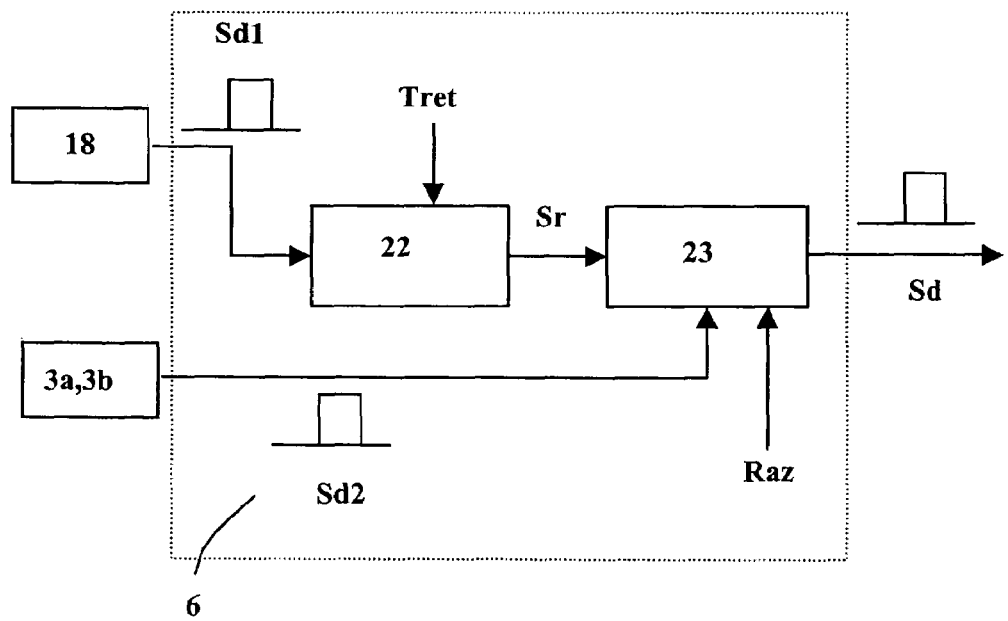

FIG. 13b is a block diagram showing another embodiment of the computation means 6. According to this embodiment, the pulse Sd1, supplied by the rear detector 18 further to the detection of the signal emitted by the source 13, is applied to a delay circuit 22 (electronic or optical). This circuit supplies the comparator 23 with a delayed signal Sr of the time Tret:

$Sr(t)=Sd1(t-Tret)$.

The comparator 23 furthermore receives the pulse Sd2 supplied by a front detector 3a or 3b further to the detection of the signal reflected by the target 5.

It then supplies a detection signal Sd if signal Sd2 reaches it before signal Sr. This means that the time gap separating Sd1 and Sd2 is less than or equal to Tret.

The comparator 23 is once again reset (input Raz) periodically at a frequency equal to the frequency of repetition of the laser source.

These schemas shown in the form of block diagrams are naturally without prejudice to the technical solution implemented to carry them out. The computation means 6 may thus be made in the form of a suitably-programmed microprocessor.

In accordance with the embodiment of the invention shown in FIGS. 11 and 12, a target detection signal may be supplied only when the reflected beam R is received by the two front detectors 3a and 3b, in a given time window, after reception (by the rear detector 18) of the beam E1 emitted by the source 13 and after a time lapse of less than or equal to a reference value Tret (thus, when the travel distances are less than a reference value).

In this case, to trigger the interception means 9, it is necessary to have a detection signal supplied quasi simultaneously by each of the detection channels 3a or 3b. Such a condition means that the target is in the interception zone 2 and that the interception means may therefore destroy it.

The signals received on 3a and 3b will arrive with a slight time lag, the distances between the target and each detector 3a, 3b possibly being different. The maximal difference in these distances allows the time window to be defined between the supplies of a detection signal by each detector. This window is of around one nanosecond. It is thus considered that the target is effectively in the interception zone if the two detection signals appear successively in this time window.

Figure 13C:
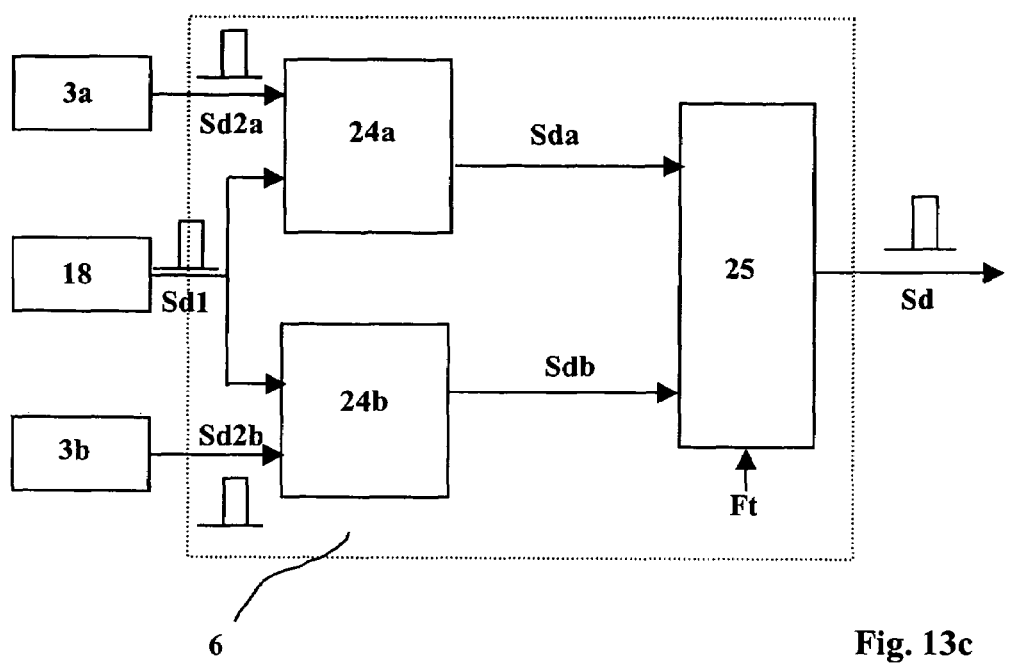

FIG. 13c is a block diagram representing the computation means implemented by the detection device according to this variant.

The computation means 6 in this case incorporate two measurement channels 24a and 24b enabling the triggering signals Sda and Sdb respectively obtained from detector 3a and 3b to be assessed.

These measurement channels will be carried out according to one or other of the solutions described previously with reference to FIGS. 13a and 13b.

A timed logic gate 25 will process the signals Sda and Sdb supplied by each measurement channel 24a and 24b. This logic gate is piloted by the circuit timer and only supplies and detection signal Sd if it receives signals Sda and Sdb in the time gap Ft (time window) memorized in the computation.

With such a variant embodiment of the invention, only the projectile 5 shown in FIG. 12 will cause the interception means 9 to be fired. Projectiles 5a and 5b which only cross the detection zone (4a or 4b) of a single detector 3a or 3b will not cause the interception means to be fired. These projectiles do not pass above the bar 9 and could not be destroyed.

Thanks to this embodiment of the invention, it is thus possible for a vehicle to be fitted with a protection device associating one laser source and several active defense modules.

Figure 14:
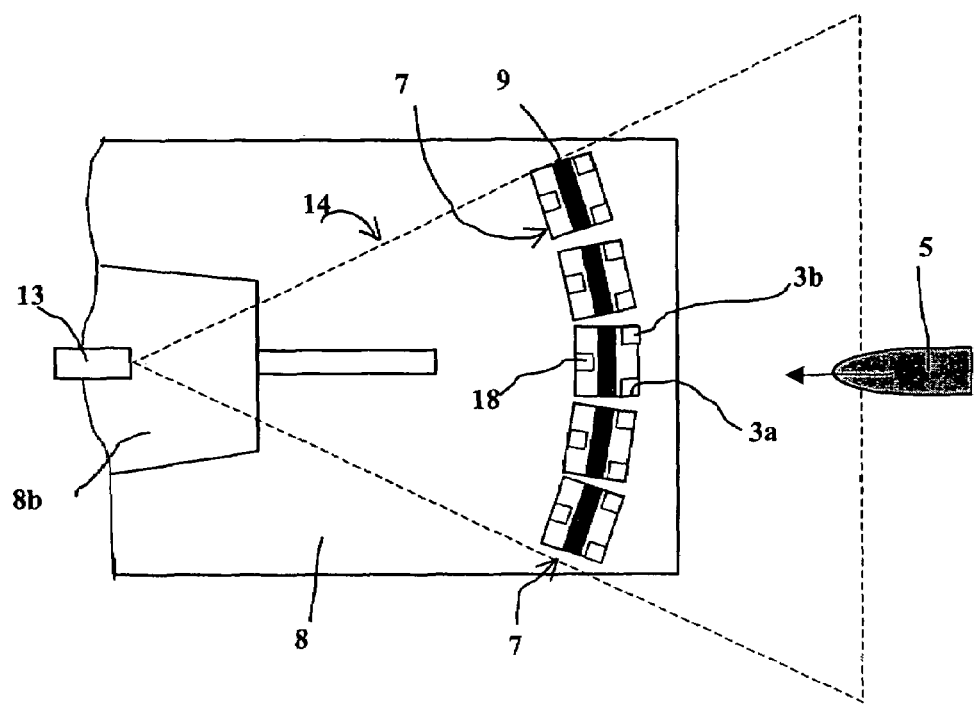

FIG. 14 thus shows a top view of a vehicle 8 with five defense modules on its front glacis. One laser source 13 is carried by the turret 8b and has an emission beam 14 whose aperture allows all the defense modules 7 to be controlled whilst intercepting the target 5.

Each defense module 7 incorporates at least one projectable bar 9 and its own front laser detectors 3a and 3b and rear detector 18.

It is thus unnecessary (as in patent DE-4008395) for complex means to be provided enabling the target 1 to be precisely located with respect to the vehicle in order to determine which defense module must be activated and at what time.

Only the module 7 concerned and effectively able to counter the target 5 will be activated (fully automatically) by control means integrated into the module 7 itself, from signals supplied by the laser source 13 and reflected by the target 5.

Figure 15:
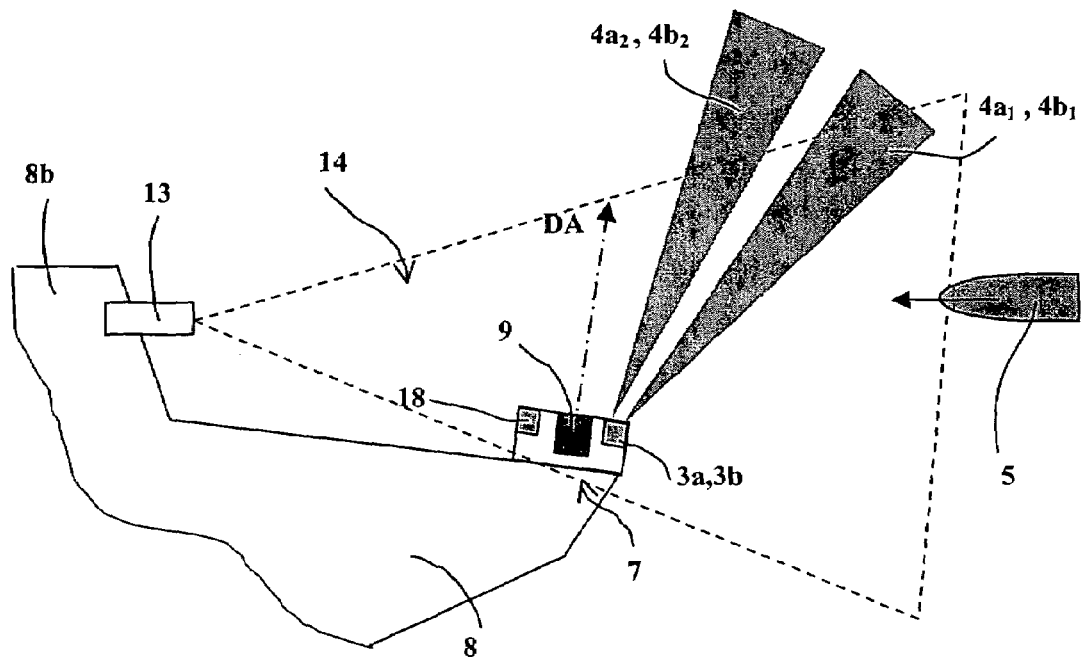

So as to improve the protection system according to the invention, it is possible, as shown in FIG. 15, to implement front detectors 3a, 3b able (thanks to suitable optics) to each observe two separate detection zones 4a1, 4a2 for detector 3a and 4b1, 4b2 for detector 3b. Each detector 3a or 3b may possibly be replaced by two detectors each having a separate detection zone.

The computation means will then compare the distance and time data supplied by the detections made in each detection zone and will prevent the module from being activated if these data are inconsistent with the range of target velocities under consideration. The defense module will thus only be activated to counter targets that it is able to destroy, thus those whose velocity falls within a given range.

It is naturally possible for detectors to be implemented that use radar technology for all the embodiments previously described.

What is claimed is:

1. A device to detect the entry of a target into a zone, comprising:
   at least one source, which is not a passive detector, for emitting an illuminating beam in the direction of a target,
   at least two passive detectors placed in proximity to said zone and whose fields of detection overlap, each detector being synchronized with at least one source by a synchronization link, and for receiving radiation reflected from said target along a different direction than the direction along which radiation is emitted by said device,
   computation means for receiving signals from said detectors and computing either the travel distances between said source and each said detector via said target, or only one of said distances which is then associated with a target presence criterion supplied by another detector, said computation means for supplying a target detection signal when said distance or distances thus computed, as well as any presence criterion or criteria supplied, enabling a point geometrically located in said zone under surveillance to be defined,
   wherein said source is placed at a distance from said passive detectors, a rear detector directly receiving the beam emitted by said source.

2. Device to detect the entry of a target into a zone according to claim 1, wherein at least one detector is discriminating, that is to say said detector incorporates a field of detection enabling at least one border of said zone under observation to be spatially discriminated.

3. A protection device comprising:
   a device to detect the entry of a target into a zone, said detection device comprising:
      at least one source, which is not a passive detector, for emitting an illuminating beam in the direction of a target,
      two forward passive detectors and one passive rear detector directly receiving the beam emitted by a distance source and whose fields of detection overlap, each detector being synchronized with at least one source by a synchronization link, and for receiving radiation reflected from said target along a different direction than the direction along which radiation is emitted by said device, and
      computation means for receiving signals from said detectors and computing either the travel distances between said source and each said detector via said target, or only one of said distances which is then associated with a target presence criterion supplied by another detector, said computation means for supplying a target detection signal when said distance or distances thus computed, as well as any presence criterion or criteria supplied, enabling a point geometrically located in said zone under surveillance to be defined,
   said protection device further comprising at least one control module or defense module, comprising an active protection means able to project in front of said target at least one interception means comprising an explosive bar, whose activation is controlled by said target detection signal after said target has penetrated into a zone of effectiveness of said control or defense module, and
   wherein said device incorporates three passive detectors and one source which is not one of said passive detectors, said source emitting said illuminating beam.

4. A protection device according to claim 3, wherein an emitting source is associated with at least two control or defense modules, each module comprising forward and rear detectors.

5. A device to detect the entry of a target into a zone, comprising:
   at least one source, which is not a passive detector, for emitting an illuminating beam in the direction of a target,
   at least two passive detectors placed in proximity to said zone and whose fields of detection overlap, each detector being synchronized with at least one source by a synchronization link, and for receiving radiation reflected from said target along a different direction than the direction along which radiation is emitted by said device, at least one bar, said detectors located substantially at the ends of said bar and
   wherein said source is placed at a distance from said passive detectors, a rear detector directly receiving the beam emitted by said source, computation means for receiving signals from said detectors and computing either the travel distances between said source and each said detector via said target, or only one of said distances which is then associated with a target presence criterion supplied by another detector, said computation means for supplying a target detection signal when said distance or distances thus computed, as well as any presence criterion or criteria supplied, enabling a point geometrically located in said zone under surveillance to be defined, wherein each detector incorporates a field of detection enabling at least one border of said zone under observation to be spatially discriminated.

* * * * *